May 20, 1969  N. J. WATERBURY  3,444,946
SELF-ELECTRIC-POWERED VEHICLE

Filed Oct. 3, 1966  Sheet 1 of 4

*INVENTOR*
NELSON J. WATERBURY

BY *Sherman & Shalloway*
ATTORNEYS

May 20, 1969     N. J. WATERBURY     3,444,946

SELF-ELECTRIC-POWERED VEHICLE

Filed Oct. 3, 1966     Sheet 2 of 4

INVENTOR
NELSON J. WATERBURY

BY *Newman E. Halloway*

ATTORNEYS

May 20, 1969  N. J. WATERBURY  3,444,946
SELF-ELECTRIC-POWERED VEHICLE
Filed Oct. 3, 1966  Sheet 3 of 4
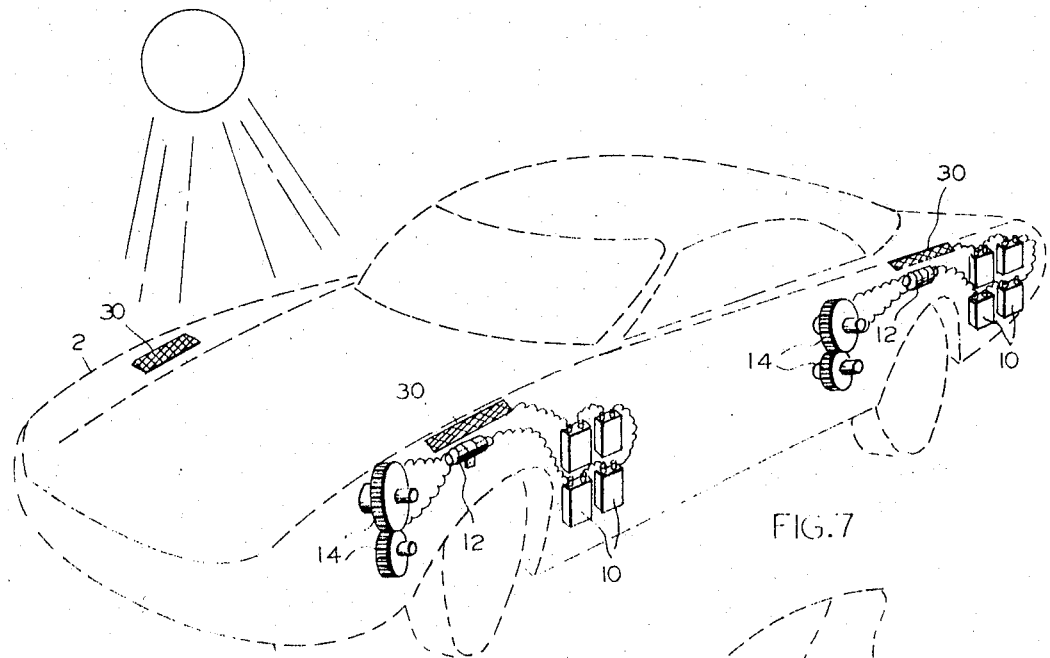
FIG.7
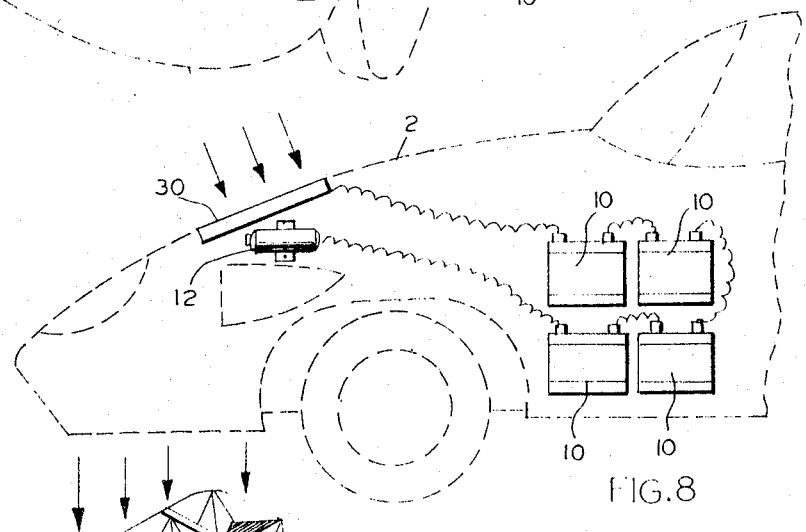
FIG.8
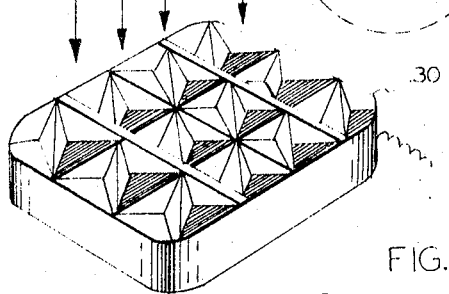
FIG.9
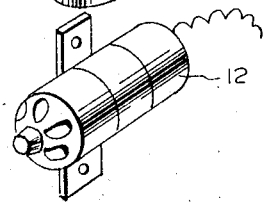
INVENTOR
NELSON J. WATERBURY
BY *Herman i Mahoney*
ATTORNEYS May 20, 1969     N. J. WATERBURY     3,444,946

SELF-ELECTRIC-POWERED VEHICLE

Filed Oct. 3, 1966     Sheet 4 of 4

INVENTOR
NELSON J. WATERBURY

BY *Norman E. Galloway*

ATTORNEYS

United States Patent Office 3,444,946
Patented May 20, 1969

3,444,946
SELF-ELECTRIC-POWERED VEHICLE
Nelson J. Waterbury, New York, N.Y., assignor of one-half to Nicholas R. du Pont, Wilmington, Del.
Filed Oct. 3, 1966, Ser. No. 583,889
Int. Cl. B60k *1/02, 1/04;* B60l *11/18*
U.S. Cl. 180—65            6 Claims

ABSTRACT OF THE DISCLOSURE

An electric motor driven vehicle having at least one electric motor to supply power to said vehicle, the improvement which comprises a system associated with each electric motor to supply electric power thereto comprising batteries arranged in series, and either a solar cell supplying energy to said batteries, a power-generating means with paddle wheel and venturi tube or both adapted to supply power to said batteries. The above combination may be used either alone or in conjunction with a conventional internal combustion engine.

---

The present invention relates to an automobile, boat or other vehicle that may be driven by electric power or a combination of electric power and gasoline power, and, more particularly, to an automobile in which electric motors are powered by batteries, which batteries are charged by the action of air currents, sunlight, or a combination of both.

In recent years, air pollution has become an ever increasing problem, especially in the area around and in large cities. The automobile is considered as the major factor in creating this problem of air pollution, the automobile contributing approximately 80% to 90% of all of the air pollution found in and around large metropolis areas.

The carbon monoxide gases and other poisons that are spewn in the atmosphere by gasoline-driven vehicles post a serious threat to life expectancy. The life of the people of today is being shortened, according to reports, from seven to ten years because of such air pollution.

Carbon monoxide gases are said to be one of the main causes of lung cancer, emphysema, heart disease and serious eye trouble as well as the dizzyness that often causes a driver to have a serious or fatal accident while operating a vehicle.

Various attempts to eliminate the air pollution problem associated with the noxious and poisonous fumes given off by an automobile have not been completely successful. Thus, for example, attempts have been made to install an after-burner device on the exhaust of an automobile so that the fumes that are egiven off by the burning of the gasoline will not be expelled directly into the atmosphere but will be subsequently burned to produce less noxious materials. While such devices have in some instances eliminated some of the problem associated with the fumes given off by automobiles, such after-burner devices have not been completely successful since it is impossible to completely eliminate all of the noxious material that is expelled to the atmosphere. Thus, even with such materials, there still is expelled to the atmosphere sufficient noxious and poisonous material tending to create serious air pollution problems.

In recent years there has been considerable experimentation with an electric car. Electric cars, per se, have been known for years. These include the small battery-operated vehicles such as golf carts, which need to be plugged in to a power source over night in order to charge the battery so that they can be employed. Attempts to apply this principle to larger cars requiring greater power sources have not beeen successful since it has not been found possible to apply a great enough power source in order to charge the battery necessary to supply the electric power for the running of the automobile without greatly inconveniencing the driver from a time standpoint. Thus, while the concept of employing electric power is known in the operation of automobiles, such electric power has not been successfully utilized in the operation of standard size automobiles because of the lack of a method, or means, to charge the batteries necessary to supply the electric power for the running of the automobiles.

In accordance with the present invention, however, a system which charges and maintains a full charge on batteries to operate an electric motor for the running of an automobile has been discovered. By the use of such system to charge and maintain the charge on batteries, it is possible to run a vehicle successfully on electric power without the use of a gasoline engine, thereby eliminating the noxious and poisonous fumes which are expelled to the atmosphere by the employment of a gasoline engine. The unique system discovered comprises the employment of an air scoop or vent or venturi tube which supplies air to a paddle wheel to run a generator or alternator which supplies the electric charge for the batteries necessary to run the electric motor-driven automobile. In a further embodiment, the present invention comprises the employment of a solar cell which supplies the charge to the battery by the employment of sunlight. In a further embodiment of the present invention, the batteries to be employed to drive electric motors of the automobile are charged, and the charge maintained by the combination of a solar cell obtaining energy from sunlight, and a generator or alternator driven by a paddle wheel in connection with a venturi tube through which air is drawn. The batteries employed are generally encased in a fender well, or recess, behind each wheel, each fender containing four batteries, two of which are in operation while the other two are being charged. These batteries in the fender well behind each wheel drive an independent electric motor associated with each wheel of the vehicle.

It is, therefore, a principal object of the present invention to provide an electric motor-driven vehicle which is free from the inherent deficiencies of previous vehicles.

It is a further object of the present invention to provide an electric motor-driven vehicle which electric motor-driven vehicle eliminates the noxious and poisonous fumes associated with the exhaust of gasoline-driven vehicles.

It is still a further object of the present invention to provide an electric motor-driven automobile in which an electric motor associated with each wheel of the vehicle is driven by batteries in series, which batteries are charged by the employment of an alternator, or generator, associated with a paddle wheel and venturi tube through which air is drawn.

It is yet a further object of the present invention to provide an electric-driven motor automobile wherein the batteries which drive the electric motor associated with each wheel of the vehicle are charged by the use of a solar cell obtaining energy from sunlight.

It is still a further object of the present invention to provide an electric motor driven automobile wherein the batteries which drive the electric motor in association with each wheel of the vehicle are charged by a combination of a solar cell obtaining its energy from sunlight, and an alternator, or generator, associated with a paddle wheel and a venturi tube through which air is drawn.

Still further objects and advantages of the vehicle of the present invention will become more apparent from the following more detailed description of the present invention and the accompanying drawings, wherein:

FIGURE 7 is a view showing a further embodiment of the present invention;

FIGURE 8 is a further view showing such further embodiment of the present invention;

FIGURE 9 is an enlarged view showing a solar cell and motor in accordance with the present invention;

In the various figures, like numerals represent like elements throughout.

Figure 1:
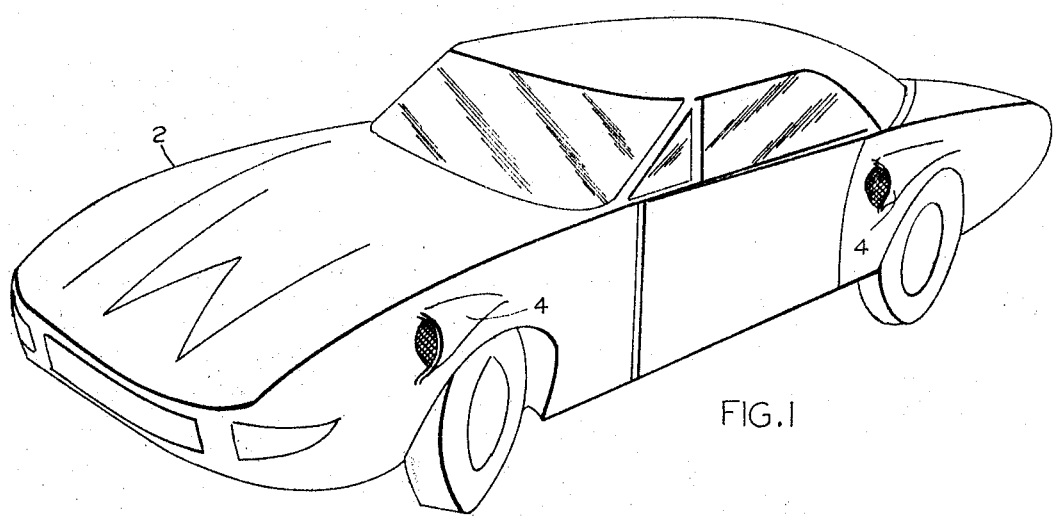
FIGURE 1 is a perspective view showing a vehicle of the present invention.
Figure 2:
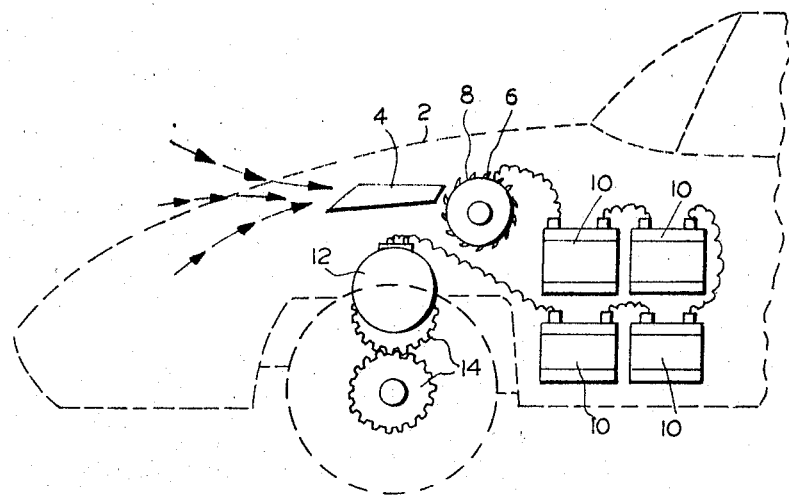
FIGURE 2 is a cross-sectional view of such vehicle showing the electric motor operating system of the present invention.
Figure 3:
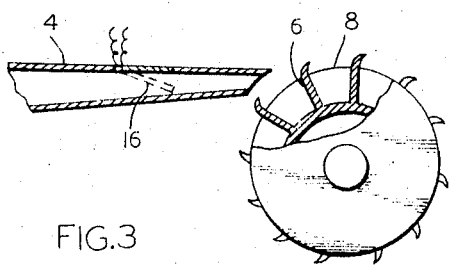
FIGURE 3 is an enlarged view in cross section showing the battery-charging means of the present invention.

In FIGURE 1 there is represented an automobile 2. As shown in FIGURE 2, the automobile has embodied in the fender, an air scoop in the form of a venturi tube 4. When the vehicle is in motion, the air rushes through the venturi tube or orifice 4, and impinges upon a flywheel or paddle wheel 6, which is aligned in the path of the air passing through the venturi tube 4. Such flywheel or paddle wheel 6 is attached to an alternator or generator 8, so that the rotational movement of the flywheel 6 caused by the impinging air from the venturi tube or orifice 4, causes the alternator or generator 8 to spin, thereby producing electrical energy supplied to batteries 10 located within a recess, or well (not shown) in the fender of the vehicle. In general, four batteries, arranged in series, are employed in each fender of the vehicle so that while two batteries are being charged, the remaining two batteries can be employed as a source of energy to operate an electric motor 12 associated with each wheel of the vehicle 2. The electric motor 12 operates to work gears 14, which gears can be arranged on the drive shaft of the vehicle, or can be directly attached to the wheel thereof. By the use of this system for operating an electric motor associated with each wheel of the vehicle, it is possible to run a vehicle such as an automobile, without the employment of gasoline. This is because the air impinging the flywheel 6 attached to the alternator or generator 8 will cause the batteries 10 to be charging so that there will be a constant and full supply of power for running the electric motors associated with the wheels of the vehicle. Therefore it will not be necessary to plug in the vehicle, or use any auxiliary source of power or energy for charging the batteries 10. In order that the batteries 10 do not become overcharged, a valve 16 is placed in the venturi tube or orifice 4, as shown in FIGURE 3. This valve 16 can be automatically controlled so as to shut off the supply of air to the flywheel 6 and attached generator 8, thereby allowing the energy stored in the batteries 10 to be utilized to operate the electric motor 12 without further charging of such batteries. The valve 16 can be automatically controlled by an electric switch (not shown) operated by the driver of the vehicle when an indicator (not shown) shows the batteries 10 to be charged to the desired level.

Figure 4:
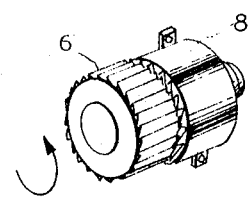
FIGURE 4 is a further enlarged view of a generator, or alternator, containing a paddle wheel for the charging of the batteries in accordance with the present invention.

FIGURE 4 illustrates how the flywheel or paddle wheel 6 is attached to the alternator or generator 8, such that the rotational movement of the alternator or generator 8 caused by the impinging air from the venturi tube or orifice 4 causes the generator or alternator 8 to spin, thereby supplying electrical energy to the batteries 10. As stated previously, in most instances, four batteries are placed in a well or recess in each fender of the auttomobile so that while two batteries are operating by supplying electrical energy to drive the electric motor associated with each wheel of the vehicle, the remaining two batteries can be charging. It is not necessary that such batteries be any specific type of battery since any conventional battery employed in automobiles, boats, etc., (i.e., four-volt, six-volt, twelve-volt, etc.) can be employed. A particularly preferred battery is a nickel-cadmium battery, which battery is capable of supplying a great deal of power without being too great in size.

Figure 5:
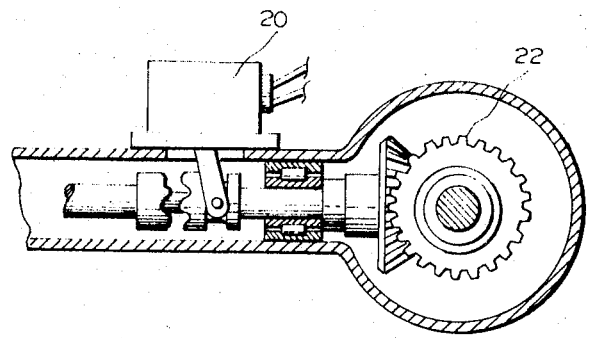
FIGURE 5 is a cross-sectional view of a drive shaft in accordance with the present invention.

In accordance with the present invention, it is possible to operate the vehicle with less than all four of the electric motors operating. In other words, it is possible to have one, two, three or four of the electric motors in the vehicle operating at any one particular time. Thus, FIGURE 5 illustrates an electric switch 20, which electric switch controls the operation of the motor associated with the drive shaft 22 and wheel of the vehicle. When it is desired to eliminate one electric motor, it is necessary only to throw such control switch on a dashboard-located control board.

Figure 6:
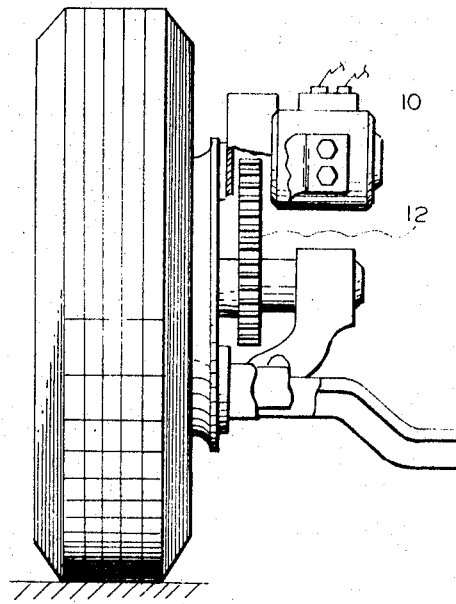
FIGURE 6 is a view showing an electric motor drive mechanism for the vehicle wheel, in accordance with the present invention.

FIGURE 6 is an enlarged view illustrating the location of the motor 12 and gearing 14 associated with the wheel of the vehicle in accordance with the present invention. As shown in this figure, each wheel of the vehicle has associated therewith a small electric motor 12, which small electric motor 12 operates through gears 14 to rotate the wheel and cause the vehicle to move.

FIGURE 7 illustrates an alternative embodiment of the present invention. In such alternate embodiment of the present invention, the vehicle 2 is driven by a small electric motor 12 driving gear 14, which electric motor 12, associated with the wheel of the vehicle, is operated by batteries 10, which batteries 10 are charged by a solar cell 30 located in the fender of the vehicle. This solar cell 30 can be any of the conventional cells which convert solar energy into electrical energy. Exemplary of such materials are the group of solar cells known as photovoltaic cells. The electrical energy produced by the solar cell 30 is employed to charge the batteries 10 in a recess, or well, located in the fender of the vehicle. Again, it is advantageous to employ four batteries so that the two can be charging while the other two are employed to operate the electric motor 12 associated with each wheel of the vehicle.

FIGURE 8 is a further representation of this alternate embodiment of the present invention showing the relationship of the solar cell 30, the batteries 10, and the electric motor 12. The solar cell 30 and the electric motor 12 are shown in a further enlarged view, FIGURE 9.

Figure 10:
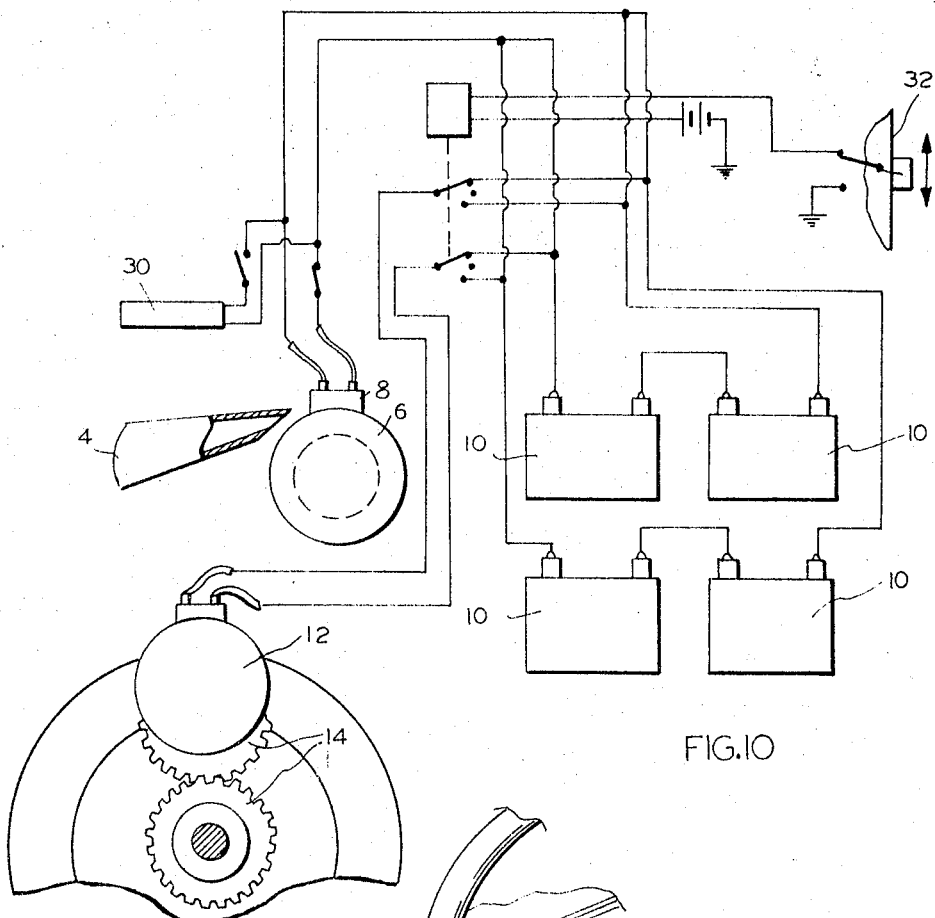
FIGURE 10 is a schematic view of a circuit employed in operating the electric motors of the present invention.

While these embodiments have been described primarily in the alternative, it is important to note that they can be employed alternatively as a source of electric power for the vehicle, or can be employed together so as to provide reserve power for the automobile. In other words, by the conjoint use of these two systems for charging batteries to drive the electric motor associated with the wheel of the vehicle, it is possible to prevent a shortage of power that may be present because of an unexpected failure of either of the systems. An electrical circuit showing the conjoint, or alternative, use of these two systems for the charging of the batteries to supply the electric power for the automobile is shown in FIGURE 10.

In addition to the alternative, or conjoint, employment of these two systems for charging the batteries of the present invention, it is possible to employ one or both of these systems in conjunction with a conventional gasoline engine. In other words, it is possible to employ, in addition to one or more of these systems for the operation of an automobile or other vehicle, a conventional gasoline engine which can be put into operation in case of an electrical failure. Moreover, the systems of the present invention can be employed as a back-up system for a conventional gasoline engine, which electrical systems can be made operational in case of a failure in the gasoline engine of the vehicle. Because of the great health hazard associated with the employment of a gasoline engine and the associated noxious and poisonous fumes given off to the atmosphere, it is, of course, preferred to employ the electrical system for operating the automobile as the principal system of operation of the automobile, with the gasoline system employed only as a back-up system, or auxiliary system, for use in case of an unexpected failure in the electrical operation of the automobile. Because of the fewer working parts, i.e., fan belts, pistons, etc., however, associated with the electrical operation of the automobile failure of such electrical operation will occur much less frequently than occurs by the use of a conventional gasoline engine in the operation of a vehicle. The employment of a solar cell as a source of energy for the charging of batteries is an additional factor which tends to prevent loss of electrical power when the automobile remains for a substantial length of time without being driven. The use of a gasoline engine will necessitate use of conventional gearing connections including drive shaft means, clutch, differential gear means for a wheel or wheels of the vehicle.

When great speeds are desired, it may be advantageous to employ a combination of gasoline power and electrical power so as to prevent a substantial drain on the electrical system of the automobile. Even when the vehicle is operating on gasoline power alone, which may be desired in some instances, it is important to note that the batteries are being constantly charged so as to always maintain a full supply of power for immediate operation of the vehicle by the electrical system. Since these batteries are therefore fully charged at all times, there is no problem starting the automobile after it has not been used for a substantial period of time.

Figure 11:
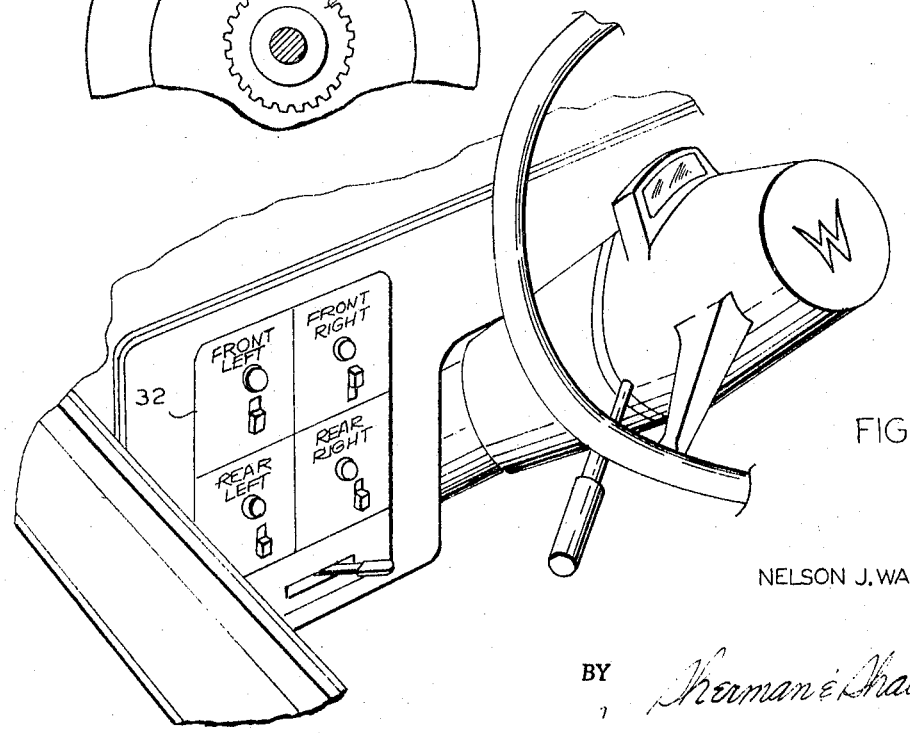
FIGURE 11 is a view illustrating an automobile control panel employed to control the electric motors of the present invention.

FIGURE 11 illustrates a typical control panel 32, which can be employed on a dashboard of a vehicle driven by electric power in accordance with the present invention. Such control panel can operate to disengage one or more of the electric motors of the vehicle when such are not necessary for operation. Thus, when the vehicle is being driven in city traffic at a relatively slow speed, it may not be necessary to operate on not more than one or two of the four electric motors, and thus the life of the electric motors can be greatly increased. This similarly increases the life of the batteries.

While the systems of the present invention have been described primarily with respect to automobiles, it should be understood that other land vehicles, e.g., buses, etc., can be similarly equipped with the electric power systems of the present invention. Furthermore, the nature of the present invention is such that air and sea vehicles can be similarly equipped.

Moreover, while the present invention has been primarily described by reference to an electric powered vehicle wherein each wheel thereof has an electric motor associated therewith, the electrical power system of the present invention can be similarly utilized in a vehicle containing only one, two, or three electric motors. For example, a single electric motor associated with the drive shaft of the vehicle can be advantageously powered by the electrical power generating systems of the present invention. Thus, a single electric motor can be powered by batteries arranged in series which batteries are charged by a combination of venturi tube and alternator or generator and attached paddle wheel, a solar cell, or a combination of such systems.

Accordingly, while the present invention has been directed primarily to certain preferred embodiments, it is to be understood that the present invention is in no way to be deemed as limited thereto, but should be construed as broadly as all or any equivalents thereof.

Having adequately described my invention, what is desired to be protected by Letters Patent is:

1. In an electric motor-driven vehicle wherein each wheel of the vehicle is provided with at least one electric motor to supply power for said vehicle, the improvement which comprises an individual system associated with each electric motor to supply electric power thereto comprising batteries charged by electric power generating means, a paddle wheel element attached thereto, and a venturi tube formed in the body of said vehicle, said venturi tube and paddle wheel element being so aligned that air through said orifice impinges upon said paddle wheel element to rotate same and operate said power generating means, a separate control for each said motor for independently operating each individual motor, and means for shutting off the air flow through each venturi tube.

2. The electric motor-driven vehicle of claim 1 wherein said vehicle further contains a conventional gasoline driven engine for auxiliary power which engine is connected by drive shaft means to at least one wheel of the vehicle.

3. In an electric motor driven vehicle wherein each wheel of the vehicle is provided with at least one electric motor to supply power for said vehicle, the improvement which comprises an individual system associated with each electric motor to supply electric power thereto comprising batteries arranged in series, said batteries charged by electric energy supplied by solar cells placed in the body of said vehicle and by electric power generating means, a paddle wheel element attached thereto, and a venturi tube formed in the body of said vehicle, said venturi tube and paddle wheel being so aligned that air through said tube impinges upon said paddle wheel element to rotate same and operate said electric power generating means, and wherein each motor of said vehicle further has a motor control for independently operating the individual electric motors associated with each wheel of said vehicle.

4. Electric motor driven vehicle of claim 3 wherein said vehicle further contains a conventional gasoline driven engine for auxiliary power which engine is connected by drive shaft means to at least one wheel of the vehicle.

5. In an electric motor-driven vehicle wherein each wheel of the vehicle is provided with at least one electric motor to supply power for said vehicle, the improvement which comprises an individual system associated with each electric motor to supply electric power thereto, comprising batteries arranged in series, said batteries charged by electric energy supplied by one or several of a plurality of sources including solar cells, an alternator, and a generator selectively adapted to be arranged in series with said battery and with each other and placed in the body of said vehicle, wherein each said motor is provided with a separate control for independently operating each said motor.

6. The electric motor-driven vehicle of claim 5 wherein said vehicle further contains a conventional gasoline driven engine for auxiliary power which engine is connected by drive shaft means to at least one wheel of the vehicle.

References Cited

UNITED STATES PATENTS

| 757,800 | 4/1904 | Williams | 290—55 |
| 1,831,071 | 11/1931 | Jones | 180—65 |
| 1,863,504 | 6/1932 | Schmid | 180—6.5 |
| 2,581,596 | 1/1952 | Nims | 180—65 |
| 2,780,765 | 2/1957 | Chapin et al. | 320—2 |
| 3,311,184 | 3/1967 | Beck | 180—1 |

FOREIGN PATENTS

| 877,563 | 9/1942 | France. |
| 887,902 | 8/1943 | France. |

OTHER REFERENCES

Popular Mechanics, June 1960, page 122 "Sun Powers Old Car."

LEO FRIAGLIA, *Primary Examiner.*

MILTON L. SMITH, *Assistant Examiner.*

U.S. Cl. X.R.

290—54